United States Patent [19]
Miller

[11] Patent Number: 5,761,425
[45] Date of Patent: Jun. 2, 1998

[54] SYSTEM FOR FACILITATING DATA TRANSFERS BETWEEN HOST COMPUTERS AND WORKSTATIONS BY HAVING A FIRST, SECOND AND THIRD COMPUTER PROGRAMS COMMUNICATE IN A MATCHING APPLICATION-LEVEL PROTOCOL

[75] Inventor: Jeffrey S. Miller, Tucson, Ariz.

[73] Assignee: CompuServe Incorporated, Columbus, Ohio

[21] Appl. No.: 349,012

[22] Filed: Dec. 2, 1994

[51] Int. Cl.⁶ .................................................. G06F 13/14
[52] U.S. Cl. .............................. 395/200.48; 395/200.57
[58] Field of Search ........................... 370/85.13, 60;
364/242.94, 242.95, 284.4, 286.5, 240.8,
228.5; 395/200.02, 200.06

[56] References Cited

U.S. PATENT DOCUMENTS

| | | | |
|---|---|---|---|
| 4,476,347 | 10/1984 | Hagen et al. ........................ | 178/3 |
| 4,768,150 | 8/1988 | Chang et al. ........................ | 395/700 |
| 4,831,620 | 5/1989 | Conway et al. ..................... | 370/85.13 |
| 4,835,674 | 5/1989 | Collins et al. ...................... | 395/200.02 |
| 4,901,312 | 2/1990 | Hui et al. ............................. | 370/85.12 |
| 4,933,937 | 6/1990 | Konishi ................................ | 370/85.13 |
| 5,086,426 | 2/1992 | Tsukakoshi et al. ................ | 370/85.13 |
| 5,136,716 | 8/1992 | Harvey et al. ...................... | 395/200.06 |
| 5,239,662 | 8/1993 | Danielson et al. .................. | 395/800 |
| 5,426,637 | 6/1995 | Derby et al. ........................ | 370/85.13 |
| 5,434,863 | 7/1995 | Onishi et al. ....................... | 370/85.13 |
| 5,446,736 | 8/1995 | Gleeson et al. ..................... | 370/85.13 |
| 5,457,681 | 10/1995 | Gaddis et al. ...................... | 370/56 |
| 5,459,720 | 10/1995 | Iliev et al. .......................... | 370/60 |
| 5,463,625 | 10/1995 | Yasrebi .............................. | 370/85.13 |
| 5,490,252 | 2/1996 | Macera et al. ...................... | 395/200.1 |
| 5,491,693 | 2/1996 | Britton et al. ...................... | 370/85.13 |
| 5,495,580 | 2/1996 | Osman ................................ | 395/187.01 |
| 5,506,961 | 4/1996 | Carlson et al. ..................... | 395/186 |
| 5,546,584 | 8/1996 | Lundin et al. ...................... | 395/700 |
| 5,596,723 | 1/1997 | Romohr .............................. | 395/200.16 |

OTHER PUBLICATIONS

Acker, B., Oracle's Annual conference the best yet, Data BAsed Advisor, v9, n12 p. 100, Dec. '91.

S. Simon, Peer-to-Peer network . . . SNA Network, IEEE Networks Magazine, pp. 30–34, Mar. 93.

*Primary Examiner*—Thomas C. Lee
*Assistant Examiner*—Anderson I. Chen
*Attorney, Agent, or Firm*—Standley & Gilcrest

[57] ABSTRACT

A system is disclosed in which Local Area Networks and Wide Area Networks are connected and specialized services are provided to facilitate communication across the networks. For Wide Area Network to Local Area Network communications, users are authenticated and permitted to access workstations via a menu system. Data transfers across the networks are completed using a matching application-level protocol to increase throughput.

18 Claims, 5 Drawing Sheets

SYSTEM FOR FACILITATING DATA TRANSFERS BETWEEN HOST COMPUTERS AND WORKSTATIONS BY HAVING A FIRST, SECOND AND THIRD COMPUTER PROGRAMS COMMUNICATE IN A MATCHING APPLICATION-LEVEL PROTOCOL

BACKGROUND AND SUMMARY OF THE INVENTION

The present invention relates generally to a system for bidirectional connection of Wide Area Networks (WANs) and Local Area Networks (LANs), and more particularly, to a computer system that enables users on a WAN to communicate with a LAN and users on a LAN to communicate with a WAN.

LANs are typically confined to a small geographic area and usually have no more than a few dozen devices connected to them. LAN users are also necessarily confined to the same geographic area unless there is a means for them to connect from outside locations. WANs, on the other hand, cover a large geographic area and may have several thousand devices connected to them. One mechanism for increasing the number of connection points to the LAN, therefore, is to allow LAN users to connect through one of the several thousand WAN devices. LANs and WANs, however, may rely on different communication protocols. Therefore, LANs and WANs that use different protocols need a protocol converter in order to communicate with each other.

In the field of data communications, gateways are highly specialized devices that interconnect dissimilar networks such as WANs and LANs. Gateways may be composed of hardware, software, or a combination of both. They usually handle the physical interface and protocol conversions, and in some cases, offer services that were performed previously in host software. Despite some common functionality, nothing dictates the characteristics of a system acting as a gateway. Therefore, they may provide simple protocol conversions or they may offer many sophisticated services. In either case, the introduction of a gateway that connects a LAN to a WAN allows the LAN to become part of a much larger, easily accessible network.

An organization may have several reasons for wanting to make its LAN more accessible. For example, an organization may want to make the information on a particular LAN accessible to its traveling sales force. Members of the sales force may have a need for accessing a LAN located in a particular city while they are conducting business in other cities and states. Another organization may want to make its LAN accessible to users across the country who have a special interest in the type of information provided on the LAN. For example, an organization that maintains a database of pharmacological information on a LAN may want to make that information available to a select group of pharmacists (normally note connected to the LAN) located in different cities across the country.

Other organizations may want to make the information on LANs located in offices across the country more accessible to all members of the organization. As a result, LAN users in different offices could communicate more readily with each other. For example, an organization may have a sales force working on a LAN in one state and a marketing group working on a LAN in another state. Communication between the two groups may be facilitated if each can access information on the other's LAN.

Although each organization may benefit from making its LAN more accessible, doing so may be difficult. One option is to set up a modem bank at the remote LAN site. Remote LAN users may then connect by making a telephone call to the LAN site. If all the lines into the modem bank are busy, the user gets a busy signal and must redial (retry) until a connection is made. The user, or perhaps the user's communication software, must initiate retries. In either case, retries are initiated from the user's end. Until the remote user is actually connected, the LAN does not communicate status information nor does it attempt connections on the user's behalf This method of connecting can be time consuming.

If the remote user is located outside a limited geographic area, the user may be required to place a long distance call to access the LAN. If the user is able to establish a connection with the LAN, the user must pay the long distance telephone charges incurred while the connection is maintained. Whether the call is local or long distance, the telephone line is in use, so that no one can call in or out, for the duration of the work session.

The organizations described above could make their LANs more accessible by connecting them to a WAN. The organization that wants to make its LANs accessible to a particular user community spread across the country may do so by connecting its LAN to a WAN that, in turn, allows remote users to connect via a workstation or terminal. Such a connection is made from a workstation/terminal to the WAN to the LAN. For the organization that wants to connect remote offices, the connection may be LAN to WAN to LAN. This type of connection may result when the LAN in each office has a gateway connecting it to the WAN. Users in each office may access the remote LAN by establishing workstation to WAN to LAN connections as described earlier.

The scenarios presented above suggest there may be many benefits to adding a LAN to a large, easily accessible network such as a WAN. However, making the physical or logical connection may be difficult. One option is to build and maintain a private WAN to which the LAN may be connected. This option, however, can be very expensive to implement. The organization may incur equipment, installation, and maintenance costs for the physical elements (computers, cables, etc.) and may also incur costs in developing and maintaining software to administer and use the WAN.

A better solution is to allow organizations with LANs to connect to an existing WAN that is built, administered, and maintained by an independent provider. In this case, both parties benefit. An organization may make its LAN available to a remote user community, but it does not incur the cost of building or maintaining the WAN infrastructure. The WAN provider supplies the needed connection points, but does not incur the additional costs of operating or administering the LAN.

The problem of connecting LANs to WANs is not solved, however, by simply making the physical or logical connection via a gateway. Once connected, remote users may want to manipulate and use—in a way that meets their particular needs—the information on the LAN. Ideally, remote users should be able to complete tasks as though they were working at the remote LAN site. Remote users should be able to view, create, move, rename, and edit files as well as be able to move from workstation to workstation.

On-line information services such as CompuServe® already have the WAN infrastructure needed to make LANs available to remote user communities. What is needed is a mechanism to connect the LAN to the on-line information service's WAN and then, once connected, a mechanism for allowing remote users to complete specific tasks. The present invention serves as this needed connection point between LANs and WANs. The present invention also provides the functionality that remote users need to complete specific tasks on the LAN. The present invention is a computer system—CompuServe Asynchronous Remote Server—(hereinafter CARS)—that may be electronically connected to a LAN and to a WAN such as the CompuServe® network. A review of the problems encountered by remote LAN providers and users illustrates the benefits and advantages of the present invention.

One problem with remote LAN access is security or control of access to the LAN. In some instances, there may be no security controls in place so that any user who establishes a connection to one workstation has full access to all workstations. In other instances, security controls may be confined to a single workstation so that remote users are permitted to access only that workstation on which security controls have been installed. Finally, even if a centralized security system is operating, the LAN administrator may want to establish different privileges for remote users and on-site users. Therefore, within the LAN, it is important to be able to distinguish remote users from on-site users.

Once connected, remote users may find that completing specific tasks is difficult. For example, users may be permitted to access only one workstation on the LAN or they may be permitted to access only a subset of the files available on the LAN. In addition, users may not be permitted to perform all the tasks they want to complete such as editing or renaming files. If users are permitted to perform a variety of specific tasks, they may be able to do so only by accessing, usually by name, a particular workstation that has the proper privileges defined. In other words, the users are required to locate the workstations on which they may complete their work. In general, no system for performing specific tasks or facilitating connections to other workstations is provided.

File transfer between a workstation on the LAN and the remote user's workstation may be slow because devices through which the data is transferred use different protocols or do not use protocols designed to maximize data throughput. Data compression and other techniques may increase the transfer rate, but do not solve the problem of using different protocols. The user may be required to invoke special purpose software to complete the data transfer. In many cases, the software handles the data transfer as a foreground activity so the remote user may not complete other tasks while the transfer is taking place.

The present invention is designed to facilitate remote user access to workstations connected to a LAN. Because it is bidirectional, the present invention also facilitates LAN user communication with WANS. The present invention is unique in that it authenticates WAN users before permitting them to use the LAN, it permits users to complete specific tasks as though they were at the LAN site, and it uses a novel transfer protocol to increase data transfer rates.

The CARS gateway is electronically connected to a LAN and to a WAN such as the CompuServe® network. Workstations and a file server may be connected to the LAN. Hosts and terminals may be connected to the WAN. Value added software is provided in CARS to establish connections and facilitate communications between a workstation on the LAN and a host on the WAN. Value added software—the Workstation Port Emulator (hereinafter WPE)—is provided at the user's workstation to facilitate communication to and from the user's workstation. A remote user who wants to connect to a LAN establishes a connection with the WAN and initiates a directive from his workstation, which is carried by the WAN, to CARS which then establishes a connection with the desired LAN. A user who wants to communicate with the WAN sends a directive from his workstation, which is carried by the LAN, to CARS which then establishes a connection with the WAN.

The system of the present invention has many advantages over present gateways because it facilitates user as well as device communications. First, for LAN to WAN connections, the present invention offers an authentication capability to verify user privileges before permitting access to the LAN. Second, for LAN to WAN connections, the present invention offers a menu system and associated operations that permit users to navigate the LAN and to complete specific tasks. For LAN to WAN and WAN to LAN connections, the present invention permits more users to establish connections via local telephone numbers or possibly, without using the telephone at all. Finally, the present invention offers an enhanced communication mode, based on a matching application-level protocol, to reduce file transfer time.

For WAN to LAN connections, LAN security is provided by CARS which verifies that a user has the appropriate privileges before being permitted to access the LAN or being permitted to perform certain tasks. These privileges may be different than those defined in the local LAN security system. For example, a user who is normally permitted to access sensitive sales data while on site may be prevented from accessing the same data remotely. With CARS, this task is accomplished easily because CARS is responsible for remote user privileges which are independent of local user privileges. As a result, CARS may provide remote security controls where there are none locally or it may provide different security controls where they do exist locally. The administration and maintenance of independent security controls on the gateway makes CARS unique.

For WAN to LAN connections, the CARS menu system and associated operations facilitate remote use and management of workstations on the LAN. Menus are presented to remote users when they establish connections to the LAN via CARS. The menus are configurable by the local LAN administrator and may be customized to meet the needs of the remote LAN users. Commands initiated via the CARS menu system allow users to upload and download files, navigate directories, display, and rename files, switch to a different LAN workstation as well as complete other tasks. This functionality is very important because it allows a remote user to do more than view and transfer data from the LAN. Furthermore, remote users are not necessarily required to know names and addresses in order to switch to different workstations on the LAN. The CARS menu system and associated operations permit remote users to complete specific tasks as though they were located at the LAN site. These sophisticated user services, provided in a gateway, are unique to CARS.

Because CARS is bidirectional, several features are common to both LAN to WAN and WAN to LAN connections. First, file transfers through CARS are accomplished by taking advantage of a protocol known to CARS, the WAN, and the WPE running on the user's workstation. The user's workstation detects file transfer requests and will take specific steps, based on its knowledge of the protocol, to improve throughput. In addition, if the user is communicating with an application on the WAN host that understands the protocol, the workstation and host allow the user to complete other tasks while the file transfer is taking place.

More remote LAN users may establish connections using local telephone numbers because the WAN, which may be accessed locally in most cases, provides the initial connection point. In addition, CARS permits local users to establish connections with the WAN without using a telephone line. Users who have access to a workstation and cable TV service may use a cable modem to connect, through CARS, to the WAN. Several benefits result from using a cable TV connection to access the WAN. First, the user is no longer required to use a telephone line to establish a connection. The telephone line remains free while the user is connected. In addition, the user does not have to pay for either a local or long distance telephone call to access the WAN.

These advantages and others will be apparent from the following detailed description of the invention, drawings, and claims.

DETAILED DESCRIPTION OF PREFERRED EMBODIMENT(S)

Figure 1:
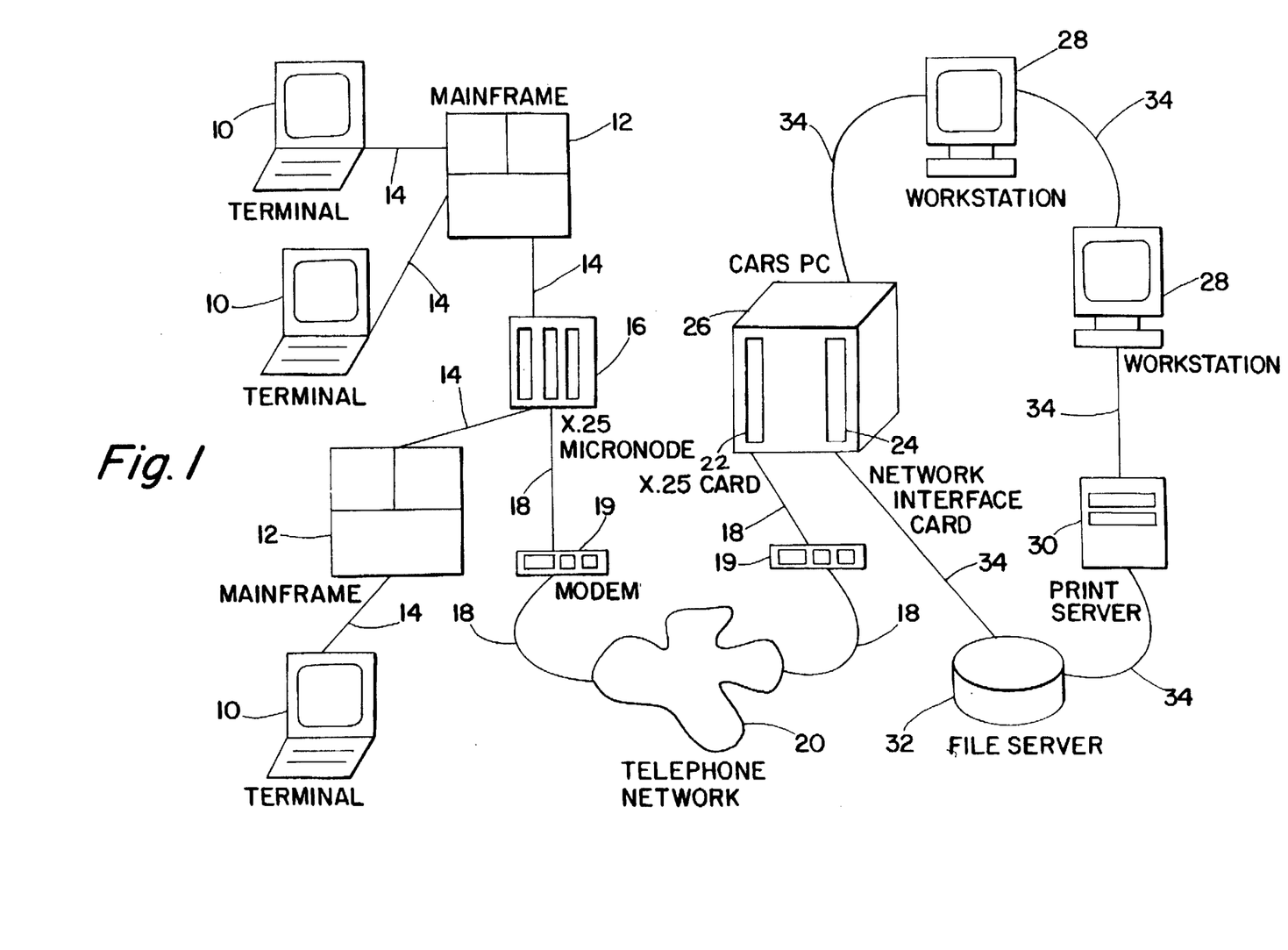
FIG. 1 is a diagrammatic view of one embodiment of the present invention.

Referring now to FIG. 1, there is shown a preferred embodiment of the system of the present invention. The LAN to which the CARS PC 26 is connected may be comprised of several workstations 28, a print server 30, and a file server 32 as well as other devices. The CARS PC 26 is connected to the LAN preferably via a Network Interface Card (NIC) 24. The cabling 34 by which the connection to CARS is made is determined preferably by the existing LAN. Cabling options include, but are not limited to, twisted pair or coaxial cable. The CARS PC 26 also is connected to a modem 19 preferably via a leased line 18 connected to an X.25 card 22 located inside the CARS PC 26.

The WAN to which the LAN is connected may be comprised of several mainframes 12 to which terminals 10 are connected and preferably an X.25 micronode 16 as well as other devices. The medium for connecting the WAN devices may be fiber optic cables 14 as well as other types of cabling. The connection between the WAN and the LAN occurs preferably through the telephone network 20 and preferably via modems 19 and leased lines 18. Actual connections between the CARS PC and the WAN are established when a LAN user attempts to connect to a host on the WAN or a WAN user attempts to connect to the CARS PC on the LAN.

Following installation, the LAN is notified of the presence of the CARS PC. Preferably, CARS is registered as a user with its own username and password. It preferably is also registered as a device and given its own NETBIOS name.

The software of the present invention facilitates communication between CARS and workstations. For workstations, communication is accomplished preferably via the WPE software that uses standard INT 14 BIOS calls so that any terminal package using INT 14 will work with CARS. Preferably, the workstation communication software supports multiple connections so that users may connect simultaneously to different hosts or LANs. The purpose of the WPE is to facilitate the communications across the devices and networks as shown in FIGS. 1, 2, 3, and 5.

Preferably, the CARS PC is equipped with software that facilitates communication between WANs and LANs. For WAN to LAN connections, CARS authenticates remote users before allowing them to access the LAN. Authentication preferably determines what information the user may access, what operations the user may perform, and which workstations the user may access. If access is allowed, CARS presents a menu system to the user so that the user may easily navigate the LAN directories, view, rename, and edit files, connect to other LAN workstations, run third party software for remote management of the LAN as well as perform other specific tasks.

Figure 2:
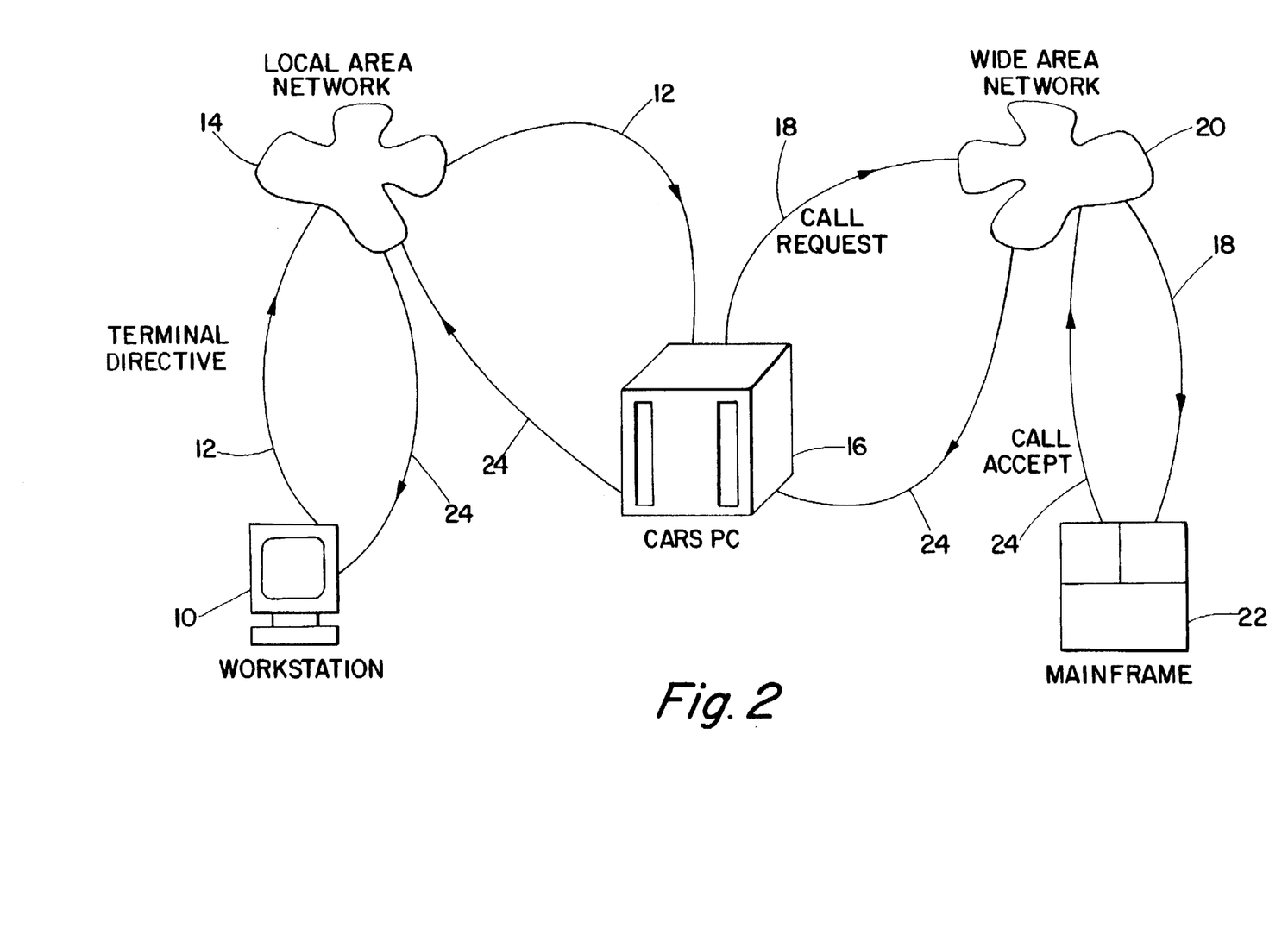
FIG. 2 is a diagrammatic view of one embodiment of the present invention for accessing a WAN from a LAN workstation.

After the hardware and software have been installed, the user is ready to establish a connection. Referring now to FIG. 2, to access and use a WAN host 22 from a remote LAN workstation 10, the user at the LAN workstation 10 may issue a terminal directive 12. The WPE running on the user's workstation 10 recognizes that the user has issued a terminal directive and sends the directive 12 through the LAN 14 which sends it to the CARS PC 16. The CARS PC 16 issues a call request 18 which passes through the WAN 20 to a WAN host 22. If appropriate, the WAN host 22 responds with a call accept 24. The call accept 24 passes through the WAN 20 to the CARS PC 16 which passes the call accept 24 to the WPE running on the workstation 10. The user may then begin communicating with the WAN host.

Figure 3:
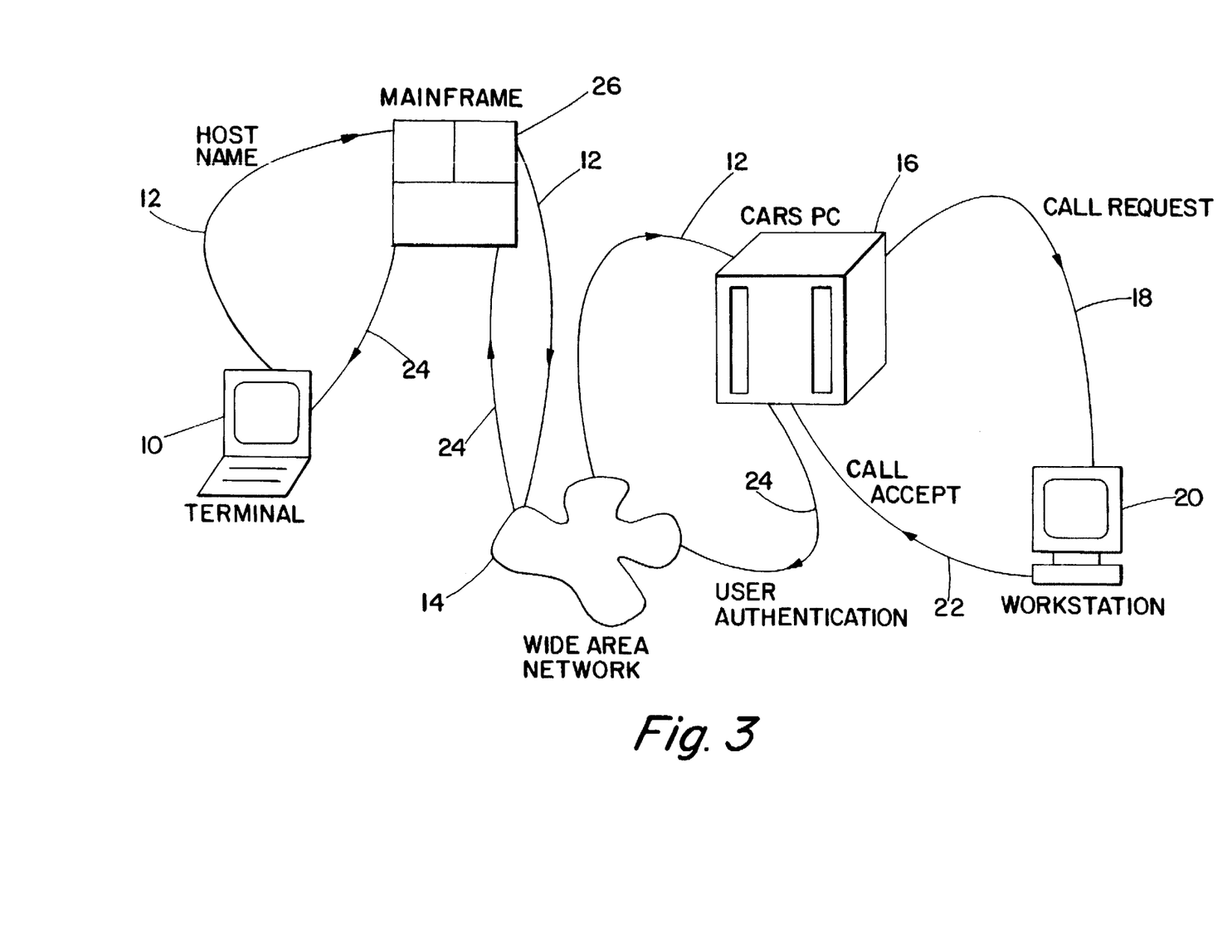
FIG. 3 is a diagrammatic view of a second embodiment of the present invention for accessing a LAN from a WAN terminal.

Referring now to FIG. 3, to access and use a LAN workstation 20 from a WAN host 26, the user issues a request to connect to a CARS PC identified by name 12. The terminal 10 recognizes that the user has issued a connect request 12 and sends the request to the WAN host 16 which sends it through the WAN to the identified CARS PC 16. Preferably, the CARS PC responds to the user with status information. If the connect request is honored, the CARS PC preferably authenticates the user before proceeding 24.

Figure 4:
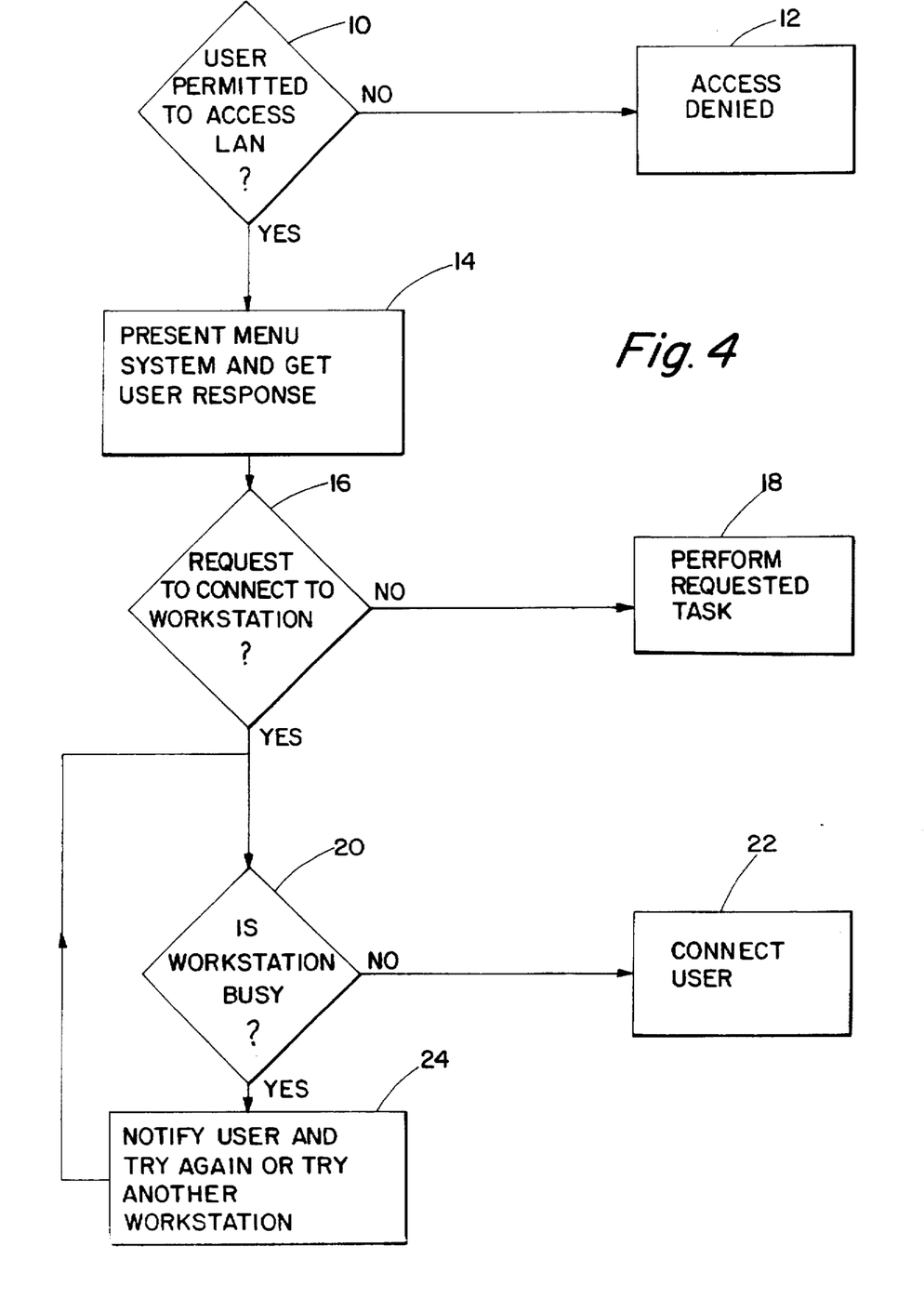
FIG. 4 is a flow diagram of the preferred system of connection of the present invention.

Referring now to FIG. 4, a conceptual view of the system is shown. If it is determined that a user should be permitted access 10, then preferably, the CARS PC presents a menu to the user 14 so that the user may interact with the LAN. The options presented to the user may reflect the privileges granted to that remote. Preferably, the user has the option of completing the following tasks 18: navigate directories, upload and download files (file transfer), view, rename, and edit files, and switch to different LAN workstations. Other tasks may be supported as well. If appropriate, users may be permitted to complete any tasks remotely that may be performed at the LAN site.

CARS may be operated to enable a user to switch to a different LAN workstation. If the user wants to connect to a particular workstation 16, CARS attempts to connect the user to that workstation 20. If the workstation is busy, CARS preferably tells the remote user that the workstation is busy and then, initiates retries 24 until the user connects to the specified workstation 22. If the user wants to connect to a workstation within a set of workstations that could fulfill the user's need, CARS may be arranged to attempt to connect to one of many workstations within a set 24. For example, the user may want to connect to any available workstation that has image enhancement and manipulation software available. If the user is planning to access data that is available from the file server, then it does not matter to which workstation the user connects as long as the necessary resources are available at that workstation. If the workstation to which CARS attempts to connect is busy 20, then CARS attempts to connect to another workstation within the set. In a preferred embodiment, CARS is constructed to visit each workstation within the set until a connection is made 22. This method of establishing a connection is more convenient and faster because user intervention is not required to initiate connection attempts to all the workstations in the set. In addition, using this construction, the user receives a message rather than a busy signal if a connection cannot be made.

The software of the present invention—which includes the WPE and software in the CARS PC—understands and takes advantage of a matching application-level communication protocol such as CompuServe's B+Protocol known by the hosts on the WAN. An understanding of the matching application-level protocol permits files to be transferred from the WAN to the LAN very quickly. File transfers complete quickly because the same protocol is known by and used by most of the devices across the network. The actual details and implementation of the protocol are not as important as is the fact that the protocol is widely used throughout the network.

When the user initiates a file transfer request, the WPE, recognizing the request, takes specific steps to improve throughput. The CARS PC and the WAN host take similar steps. The fact that the WPE and CARS understand the matching application-level protocol, which is known also to the WAN hosts, is unique to CARS. Improved throughput cannot be achieved unless these devices through which the data passes understand the matching application-level protocol. Another feature of the present invention is that a user is not required to invoke any special software in order to take advantage of the matching application-level protocol. As a result, the data transfer may occur in the background so the user can continue working with other host applications while the transfer is completed. In other words, computer programs running on the host computer understand that a transfer is taking place and provide a way for the user to complete tasks unrelated to the transfer. The user is not required to stop all work while the transfer takes place.

Figure 5:
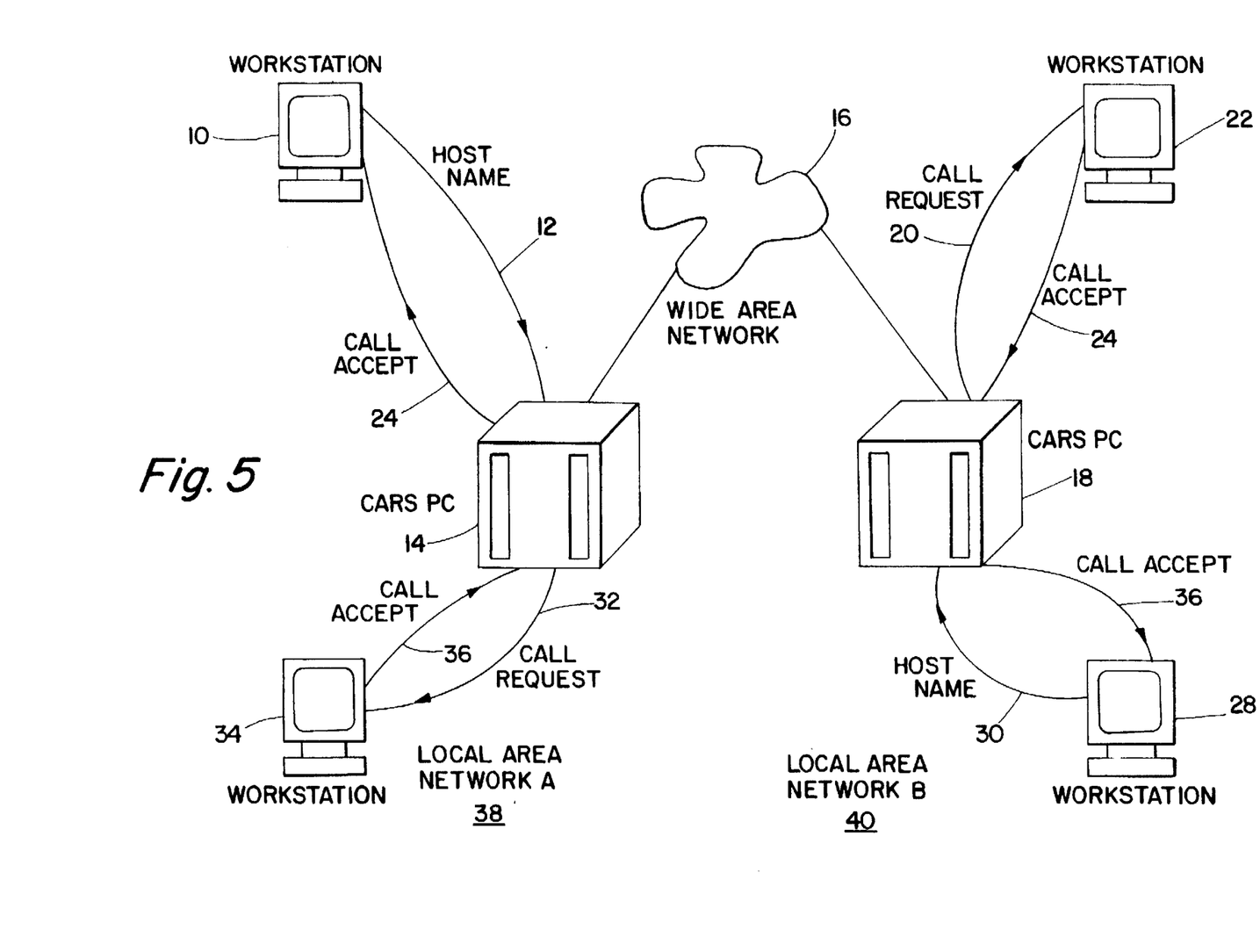
FIG. 5 is diagrammatic view of another embodiment of the present invention for accessing a remote LAN from another LAN, via a WAN.

Referring now to FIG. 5, another embodiment of the present invention is shown. LAN workstation to WAN to LAN workstation communication is accomplished, preferably, by installing a CARS PC at each LAN site. In such an arrangement, the WAN 16 serves as a conduit between the workstations 10, 22, 28, 34 on the LANs 38,40. To connect to a workstation on LAN B 40, the remote user on LAN A 38 issues a request to connect 12 to the CARS PC 18 on LAN B 40. The CARS PC 14 at the user's LAN A site sends the directive to the WAN 16 which passes the request to the CARS PC 18 at remote LAN B 40. The CARS PC 18 sends a call request 20 to the workstation 22. If the connect request is accepted, the call accept 24 is processed by the CARS PC 18 on LAN B 40, sent through the WAN 16, sent through the CARS PC 14 on LAN A 38 and to the remote user's workstation 10. The remote user 10 is then connected to the workstation 22 on LAN B 40 and communications take place between the workstation 10 on the local LAN 38, the local CARS PC 14, the WAN 16, the remote CARS PC 18, and the workstation 22 on the remote LAN 40.

To connect to a workstation on LAN A, the remote user 28 on LAN B 40 issues a request to connect 30 to the CARS PC 14 on LAN A 38. The CARS PC 18 at the user's LAN B site sends the directive to the WAN 16 which passes the request to the CARS PC 14 at remote LAN A. The CARS PC 14 sends a call request 32 to the workstation 34. If the connect request is accepted, the call accept 36 is processed by the CARS PC 14 on LAN A 38, sent through the WAN 16, sent through the CARS PC 18 on LAN B 40 and to the remote user's workstation 28. The remote user 28 is then connected to the workstation 34 on LAN A and communications take place between the workstation 28 on the local LAN 40, the local CARS PC 18, the WAN 16, the remote CARS PC 14, and the workstation 34 on the remote LAN 38.

The present invention is unique for several reasons, but primarily, it provides sophisticated device and user services within a gateway so that LANs and WANs may be connected and once connected, are easy and convenient to use. Furthermore, the present invention is unique because it allows remote LAN users to complete specific tasks as though they were located at the LAN site. The present invention has been described in the form of preferred embodiments, but several modifications and variations to the invention could be made and fall within the scope of the subjoined claims.

What is claimed is:

1. A system for facilitating network communication comprising:

a wide area network of host computers and terminals;

a local area network of workstations;

a first connection between said local area network and a server;

a second connection between said wide area network and said server;

a first computer program at said server for communicating in a matching application-level protocol;

a second computer program at said host computers and a third computer program at said workstations for communicating in said matching application-level protocol;

a means for automatic connection from said wide area network terminals to said local area network workstations;

a means for authenticating users seeking access to said local area network workstations;

a means for users to view and manage data on said local area network workstations;

a means for users to connect to other workstations on said local area network; and a means for users to transfer data between said host computers and said local area network workstations using said matching application-level protocol.

2. The system of claim 1 wherein said wide area network is an on-line information service network.

3. The system of claim 1 wherein said matching application-level protocol accomplishes file transfer in the background.

4. The system of claim 1 wherein said automatic connection is accomplished via a menu selection.

5. The system of claim 1 wherein said means for authenticating users includes a means for distinguishing a user's remote privileges from on-site privileges.

6. The system of claim 1 wherein said automatic connection is accomplished via a menu selection.

7. A method of connecting a local area network and wide area network, said method comprising the steps of:

connecting workstations on said local area network to a server;

connecting a computer host on said wide area network to said server;

providing a first connection between said local area network and said server;

providing a second connection between said wide area network and said server;

providing a first computer program at said server;

providing a second computer program at said host computer to authenticate users seeking access to said local area network workstations to connect users on said workstations to other workstations on said local area network, and to connect users on said computer hosts to said local area network workstations; and providing a third computer program at said workstations whereby said first, second, and third computer programs send and receive messages using a matching application-level protocol to facilitate data transfers.

8. The system of claim 7 wherein said wide area network is an on-line information service network.

9. The system of claim 7 wherein said matching application-level protocol facilitates background file transfer.

10. A system for facilitating network communication comprising:

a wide area network of host computers and terminals;

a local area network of workstations;

a first connection between said local area network and a server;

a second connection between said wide area network and said server;

a first computer program at said server;

a second computer program at said host computers;

a third computer program at said workstations whereby said first, second, and third computer programs send and receive messages using a matching application-level protocol to facilitate data transfers;

said second computer program provides a means for automatic connection from said wide area network terminals to said local workstations;

said second computer program provides a means for authenticating users seeking access to said local area network workstations;

said second computer program provides a means for users to view and manage data on said local area network workstations; and said second computer program provides a means for users to connect to other work stations on said local area network.

11. The system of claim 10 wherein said wide area network is an on-line information service network.

12. The system of claim 10 wherein said matching application-level protocol supports file transfer as a background activity.

13. The system of claim 10 wherein said means for authenticating users includes a means for distinguishing user's remote privileges from on-site privileges.

14. A method for facilitating network communication comprising:

connecting a wide area network of host computers and terminals and a local area network of workstations to a server;

communicating in a matching application-level protocol via a first computer program at said server;

communicating in said matching application-level protocol via a second computer program at said host computers and a third computer program at said workstations;

automatically connecting said wide area network terminals to said local area network workstations;

authenticating users seeking access to said local area network workstations;

presenting and managing data for users on said local area network workstations;

connecting users to other workstations on said local area network; and transferring data between said host computers and said local area network workstations using said matching application-level protocol.

15. The method of claim 14 wherein said wide area network is an on-line information service network.

16. The method of claim 14 further comprising the step of accomplishing background data transfer between said host computers and said local area network workstations using said matching application-level protocol.

17. The method of claim 14 further comprising the step of automatically connecting said wide area network terminals to said local area network workstations via a menu selection.

18. The method of claim 14 further comprising the step of authenticating users via a means for distinguishing a user's remote privileges from on-site privileges.

* * * * *